US006493696B1

(12) United States Patent
Chazin

(10) Patent No.: US 6,493,696 B1
(45) Date of Patent: Dec. 10, 2002

(54) MESSAGE FORWARDING OF MULTIPLE TYPES OF MESSAGES BASED UPON A CRITERIA

(75) Inventor: David Chazin, Denver, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/548,767

(22) Filed: Apr. 13, 2000

(51) Int. Cl.[7] .............................................. G06F 17/00
(52) U.S. Cl. ............................. 706/47; 706/45; 706/11
(58) Field of Search ............................. 706/45, 47, 11; 707/6; 709/206, 207

(56) References Cited

U.S. PATENT DOCUMENTS 5,687,220 A   11/1997  Finnigan ..................... 379/67
5,742,905 A   4/1998   Pepe et al. .................. 455/461
6,023,700 A   2/2000   Owens et al. ................. 707/10

FOREIGN PATENT DOCUMENTS

EP          0 854 655 A2     7/1998

OTHER PUBLICATIONS

M.G. Brown, J.T. Foot, G.J. F. Jones, K. Sparek Jones, S.J. Young, "Open–Vocabulary Speech Indexing for Voice and Video Mail Retrieval," p. 307–316, (Nov. 18, 1996).

Primary Examiner—Thomas Black
Assistant Examiner—Joseph P. Hirl
(74) Attorney, Agent, or Firm—Patton Boggs LLP

(57) ABSTRACT

A method and system for processing messages received by a message storage system. The message storage system receives a message. The type of the message received is then determined. The message is then scanned for user specified content based upon the type of message. If the user specified content is found, message handling rules are applied to the message.

30 Claims, 3 Drawing Sheets

MESSAGE FORWARDING OF MULTIPLE TYPES OF MESSAGES BASED UPON A CRITERIA

FIELD OF THE INVENTION

This invention relates to messaging systems. More particularly, this invention relates to a process for sorting messages received by the messaging system for a user. Still more particularly, this invention relates to a messaging system that all types of incoming messages for a user specified content and handling incoming messages containing the user specified content in a user specified manner.

1. Problem

Today, it is common for a user to have a message storage system that stores multiple types of messages for the user in a user mailbox. For example, calls to the user are forwarded by a switch to the messaging system when the user is unavailable and e-mails to the user may be forwarded by a server to the same messaging system. It is common for such system to store telephone messages, e-mails, faxes and other types of messages.

Sometimes a user is expecting a message from another person and does not know what type of message the person will send. For example, a salesman may be expecting an order from a customer. The customer may call the salesman, send an e-mail or fax an order request. Since the expected order may come in any type of message, it would be desirable for an agent operating the message system to be able to scan all messages regardless of type to detect the desired message when the message is received and to handle the message in a user specified manner. For example, it may forward a telephone message to another telephone or may page the user when the desired message is received.

2. Solution

The above and other problems are solved and an advance in the art is made by a messaging system that processes messages based upon user specified content. An advantage of this messaging system is that multiple types of messages may be processed looking for user specified content. This assures that a message including the specified content are handled in a desired manner. For example, a user is assured to receive a message including a contract which may come in an e-mail or as a fax.

In accordance with this invention, a messaging system or processor that is connected to the messaging system executes applications that provide a message agent that manages the storage of messages by the message storage system. The message agent receives a message for a user. The message agents then determine which type of message was received. The message is then scanned for user specified content based upon the type of message received. If user specified content is contained in the message, message handling rules are applied to the message.

Before a process in accordance with this invention is performed, the message agent may determine whether a user has provided user specified content. If the user has not provided user specified content, the message is stored in a conventional manner like all other messages received. This allows a user to choose when the processes in accordance with this invention are implemented.

If a message contains user specified content, the message agent may determine whether a rule is activated for the type of message received. If a rule is activated for the type of message received, the rule is applied to the message. Otherwise, the message is stored in a conventional manner. This allows the user to select only those certain types of messages to handle with priority. If the message does not contain user specified content, the message agent stores the message in a conventional manner.

The user may input user specified content. The user specified content is received by the message agent. The message agent then converts the user specified content into a format of each type of message that may be scanned. The rules for handling each type of message are received from the user. The rules may be received in the following manner. The message agent receives a type of message to handle from the user. The message agent then prompts the user for a message handling rule and receives a rule for handling that type of message from the user.

DESCRIPTION OF THE DRAWINGS

The above and other features of this invention are described in the detailed description below and the following drawings.

DETAILED DESCRIPTON

Figure 1:
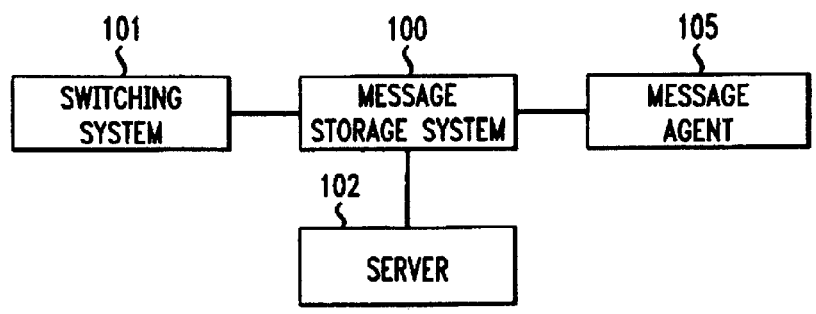
FIG. 1 illustrating a switching system and messaging system that provide message service in accordance with this invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

FIG. 1 illustrates a messaging system 100 that stores messages and performs the message forward based upon voice recognition in accordance with this invention. Message storage system 100 is connected to switching system 101 and server 102. Switching system 101 forwards telephone calls to message storage system 100 to allow a caller to leave a voice message. Switching system 101 may also forward fax and other types of telephone calls to message storage system 100 to allow message storage system 100 to store other types of messages. Server 102 may forward e-mail and other types of messages to message storage system 100. One skilled in the art will recognize that other types of devices may also be connected to message storage system 100 and that only one of the two shown devices may be connected to message storage system 100.

Message storage system 100 is also connected to a message agent 105. Message agent 105 is a software application that is executed by a processing unit that is either contained in message storage system 100 or connected to message storage system 100. Message agent 105 controls the storage of message in message storage system 100.

Figure 2:
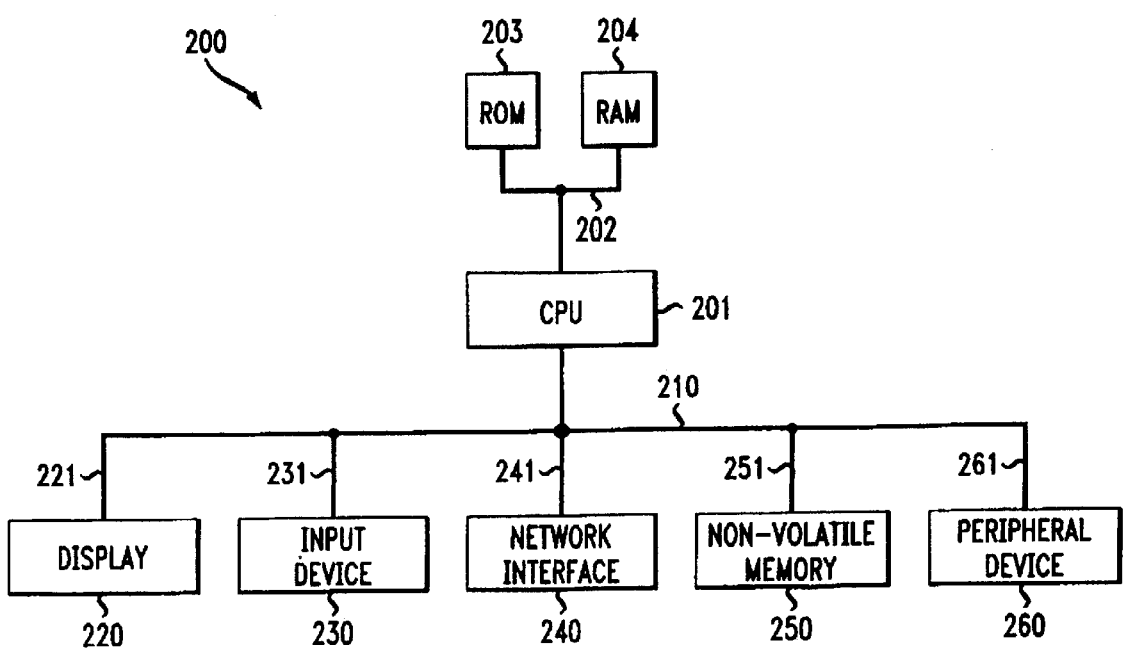
FIG. 2 illustrating a processing system that is connected to processing system that executes a message agent that executes the applications in accordance with the present invention.

FIG. 2 illustrates a processing system 200 that executes the applications that provide the message agent 105 which provides the message handling based upon voice recognition in accordance with this invention. Processing system 200 has a central processing unit (CPU) 201 which executes instructions read from a memory to perform applications that comprise the operations of processing system 200. CPU 201 is connected to a memory bus 202. Memory bus 202 allows CPU 201 to access Read Only Memory (ROM) 203 and Random Access Memory 204. ROM 203 is a memory that stores instructions for performing the basic operative tasks of processing system 200. RAM 204 is a memory that stores the instructions and data needed to execute applications that are performed by processing system 200.

I/O bus 210 connects CPU 201 to a plurality of peripheral devices. CPU 201 receives and transmits data to the peripheral devices via I/O bus 210. The peripheral devices connected to I/O bus 210 include, but are not limited to, display 220, input device 230, network interface 240, and non-volatile memory 250. Display 220 is connected to I/O bus 210 by path 221 and includes a video driver and connected monitor for displaying information to a user. Input device 230 is connected to I/O bus 210 via path 231 and is a keyboard and/or mouse attached to an appropriate driver for receiving input data from a user. Network interface 240 is connected to I/O bus 210 via path 241 and is a modem or Ethernet device driver that allows processing system 200 to communicate with a second processing system. Non-volatile memory 250 is a device, such as a disk drive, connected to 1/O bus 210 via path 251 and which can read and write data to a disk or other storage media to store the data for future use. Peripheral device 260 is a device that is controlled by processing system 200 and transmits data between the CPU 201 and the device via path 261.

Figure 3:
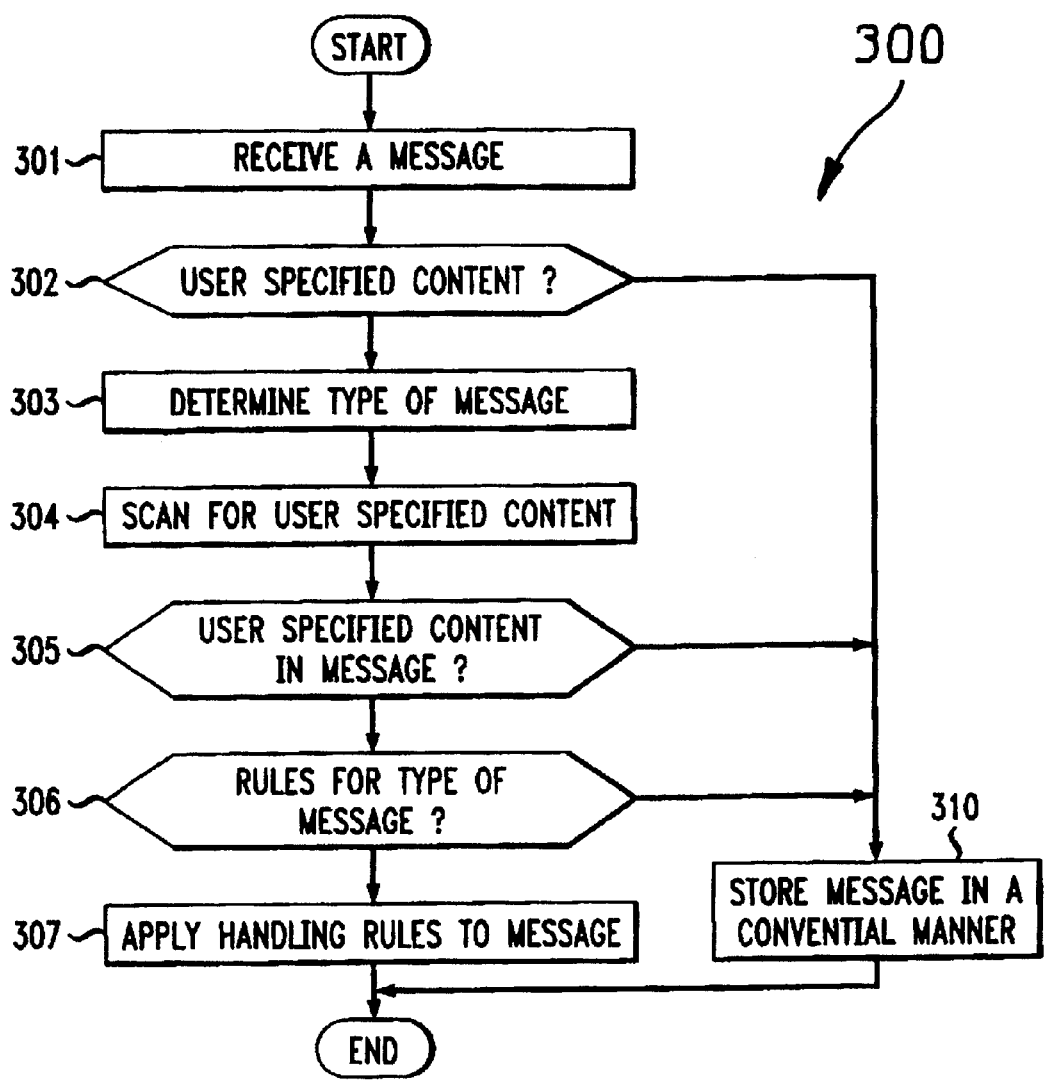
FIG. 3 illustrating a process executed by a message agent when a message is received in accordance with this invention.

FIG. 3 illustrates process 300 that is executed by message agent 102 to provide the message forwarding based upon voice recognition in accordance with the present invention. Process 300 begins when a device forwards a message to message storage system 100. In step 301, message agent 105 receives a message. If message handling in accordance with this invention is optional, message agent 105 may determine whether a user has provided user specified content for the message in step 302. For purposes of this discussion, user specified content may be a word or string of words that represents a category of message that the user wants handled. For example the word or string of words may be a name of a sender, a type of document, or other such representation of the content of the message.

If the user has not provided user specified content, the message is stored in a conventional manner in step 310. If the user has provided user specified content, message agent 102 determines the type of message received in step 303. Some examples of the type messages include e-mails, voice messages, and faxes. After the type of the message is determined, the message is scanned for user specified content in the format needed for the determined type of message in step 304. Scanning is performed differently for different types of message. For example, a voice message may be scanned with a voice recognition software or by determining the number of the telephone that sent the message, e-mail may be scanned for a word or string of words or the sender, and a fax may be scanned for a word or a string of words or the telephone number that sent the fax. In these examples, the faxes and e-mails are stored in different electronic formats. Therefore, different scans are required to find the user specified content. In step 305, it is determined whether the user specified content is contained in message.

If the user specified content is included in the message in step 305, the message is stored in the conventional manner in step 310. If the user specified content is included in the message in step 305, the message agent may determine whether there are message handling rules for the type of message received in step 306.

If there are no rules for handling that type of message in step 306, the rules message is stored in a conventional manner in step 310. If there are message handling rules for that type of message in step 306 or step 305 is skipped since process 300 is only executed if there are message handling rules for messages, the message handling rules for that type of message are applied to the message in step 307. Some examples of rules include but are not limited to forwarding a voice message to another telephone number, forwarding an e-mail to another e-mail address, forwarding a fax to another number, or converting the fax to an e-mail. After step 307 or step 310, process 300 ends.

Figure 4:
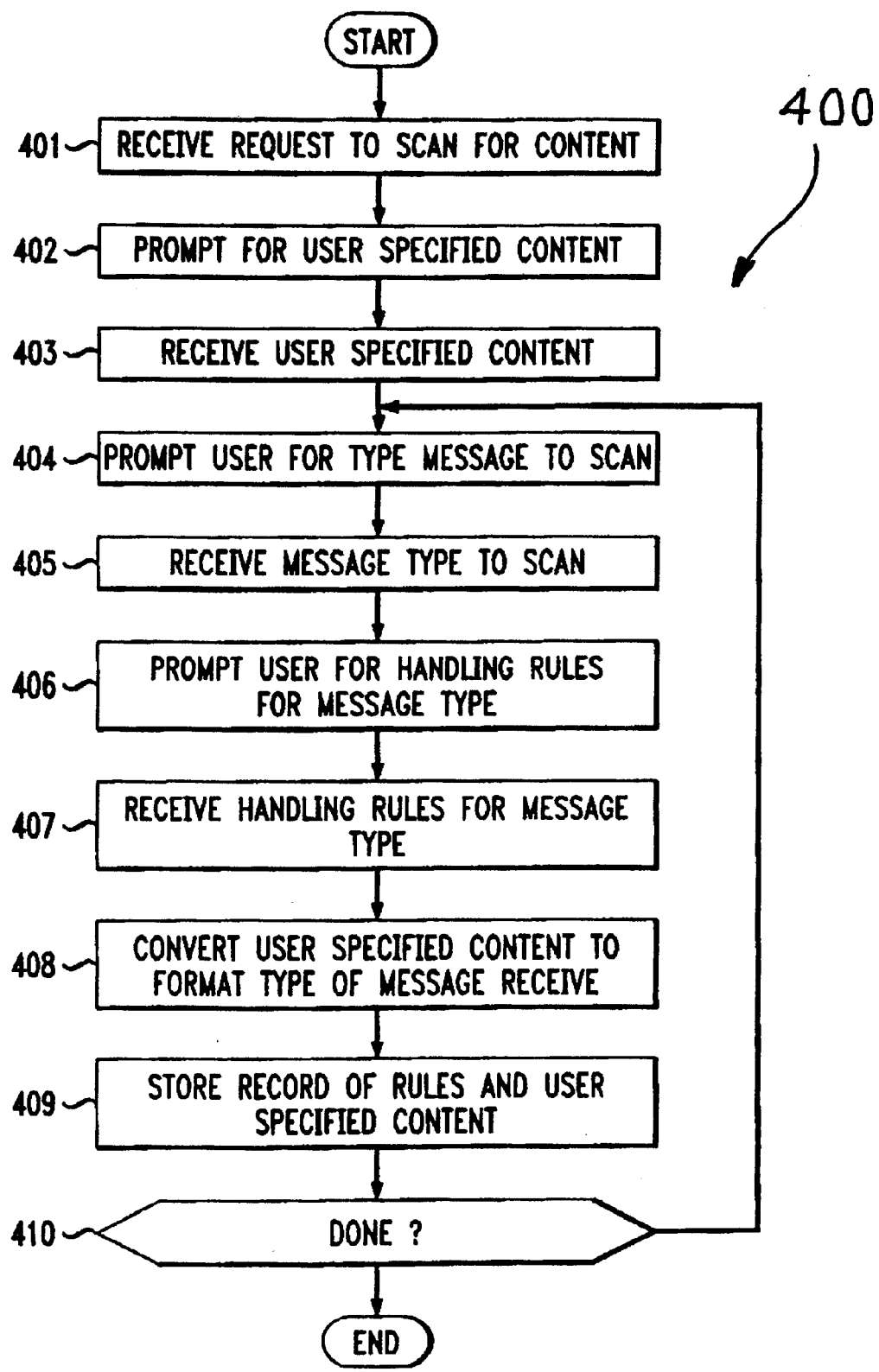
FIG. 4 illustrating a process for Programming the Message Processing System in accordance with this invention.

FIG. 4 illustrates a process 400 for programming the message processing system in accordance with this invention. Process 400 begins in step 401 by receiving a request to scan messages for user specified content. This may be received via a telephone call to the message system through prompts through a menu or may be a software interface with a computer connected via a server. In step 402, the message agent prompts the user for specified content.

The user input of user specified content is received in step 403. The content may be entered via a telephone by voice, or by in-band or out of band signals. The content may also be a string of characters input to a computer by the user. The user specified content may be a string representing an identity of person, or may be a string of words or image contained in a message.

In step 404, the system then may prompt the user for a type of message to scan for the user specified content. A type of message is received from the user in step 405. The user may then be prompted for message handling rules for this type of message in step 406. Some example of message handling rules include forwarding a voice message to a telephone, forwarding an e-mail to another address, or faxing a fax message to another telephone number. In step 407, message handling rules for the type of message are received from the user.

In step 408, the user specified content is converted to a format for the received type of message. This format will be used to scanning messages of this type for the user specified content. In step 409, a record is stored for this type of message that includes the handling instructions for this type of message and the user specified content in the proper format. The user is then prompted to determine if the user if done selecting types of messages in step 410. If the user is done, process 400 ends. Otherwise, process 400 is repeated from step 404 to get another type of message.

The above is a description of a messaging system that processes messages based upon user specified content. It is expected that those skilled in the art can and will design alternative messaging systems that infringe on this message processing system as set forth in the claims below either literally or through the Doctrine of Equivalents.

What is claimed is:

1. A method for processing messages received by a message storage system comprising the steps of:

receiving a message;

determining a type of said message received;

scanning said message for user specified content based upon said type of message; and applying message handling rules to said message responsive to a determination that said message contains said user specified content.

2. The method of claim 1 further comprising the steps of:
determining whether a user has provided said user specified content; and
said step of determining said message being responsive to a determination that said user has provided said user specified content.

3. The method of claim 2 further comprising the step of:
storing said message in a conventional manner in response to a determination that said user has not provided said user specified content.

4. The method of claim 1 further comprising the step of:
determining whether a rule is activated for said type of said message responsive to a determination that said message contains said user specified content; and
said step of applying said message handling rules to said message being responsive to a determination that said rule being activated for said recognized caller.

5. The method of claim 4 further comprising the step of:
storing said message in a conventional manner responsive to a determination that said rule is not activated for said type of said message.

6. The method of claim 1 further comprising the step of:
storing said message in a conventional manner responsive to a determination that said message does not contain said user specified content.

7. The method of claim 1 further comprising the steps of:
receiving user specified content from a user.

8. The method of claim 7 further comprising the step of:
converting said user specified content into a format of each said type of message.

9. The method of claim 1 further comprising the step of:
receiving said message handling instructions from said user.

10. The method of claim 9 further comprising the step of:
receiving a type of message to handle; and
receiving a rule for handling said instruction.

11. A system for processing messages received by a message storage system comprising:
a processing unit in said message storage system;
instructions for directing said processing unit in said messaging storage system to:
receive a message;
determine a type of said message received;
scan said message for user specified content based upon said type of said message; and
apply message handling rules to said message responsive to a determination that said message contains said user specified content.

12. The system of claim 11 wherein said instructions for directing said processing unit further comprises:
instructions for directing said processing unit in said message storage system to:
determine whether a user has provided said user specified content; and
said instructions for determining said type of said message being responsive to a determination that said user has provided said user specified content.

13. The system of claim 12 wherein said instructions for directing said processing unit further comprises:
instructions for directing said processing unit in said message system to store said message in a conventional manner in response to a determination that said user has not provided said user specified content.

14. The system of claim 11 wherein said instructions for directing said processing unit further comprises:
instructions for directing said processing unit in said message system to:
determine whether a rule is activated for said type of said message responsive to a determination that said message contains said user specified content; and
said instructions for applying said message handling rules to said message being responsive to a determination that said rule being activated for said recognized caller.

15. The system of claim 14 wherein said instructions for directing said processing unit further comprises:
instructions for directing said processing unit in said message system to store said message in a conventional manner responsive to a determination that said rule is not activated for said type of said message.

16. The system of claim 11 wherein said instructions for directing said processing unit further comprises:
instructions for directing said processing unit in said message system to store said message in a conventional manner responsive to a determination that said message does not contain said user specified content.

17. The system of claim 11 wherein said instructions for directing said processing unit further comprises:
instructions for directing said processing unit in said message system to receive user specified content from a user.

18. The system of claim 17 wherein said instructions for directing said processing unit further comprises:
instructions for directing said processing unit in said message system to convert said user specified content into a format of each said type of message.

19. The system of claim 11 wherein said instructions for directing said processing unit further comprises:
instructions for directing said processing unit in said message system to receive said message handling instructions from said user.

20. The system of claim 19 wherein said instructions for directing said processing unit further comprises instructions for directing said processing unit in said message system to:
receive a type of message to handle; and
receive a rule for handling said instruction.

21. An apparatus for processing messages received by a message storage system comprising:
means for receiving a message;
means for determining a type of said message received;
means for scanning said message for user specified content based upon said type of message; and
means for applying message handling rules to said message responsive to a determination that said message contains said user specified content.

22. The apparatus of claim 21 further comprising:
means for determining whether a user has provided said user specified content; and
said means for determining said type of said message being responsive to a determination that said user has provided said user specified content.

23. The apparatus of claim 22 further comprising:
means for storing said message in a conventional manner in response to a determination that said user has not provided said user specified content.

24. The apparatus of claim 21 further comprising:

means for determining whether a rule is activated for said type of said message responsive to a determination that said message contains said user specified content; and said means for applying said message handling rules to said message being responsive to a determination that said rule being activated for said recognized caller.

25. The apparatus of claim 24 further comprising:

means for storing said message in a conventional manner responsive to a determination that said rule is not activated for said type of said message.

26. The apparatus of clam 21 further comprising:

means for storing said message in a conventional manner responsive to a determination that said message does not contain said user specified content.

27. The apparatus of claim 21 further comprising:

means receiving user specified content from a user.

28. The apparatus of claim 27 further comprising:

means for converting said user specified content into a format of each said type of message.

29. The apparatus of claim 21 further comprising:

means for receiving said message handling instructions from said user.

30. The apparatus of claim 29 further comprising:

means for receiving a type of message to handle; and means for receiving a rule for handling said instruction.

\* \* \* \* \*